US010108640B2

(12) United States Patent
Kawai (10) Patent No.: US 10,108,640 B2
(45) Date of Patent: Oct. 23, 2018

(54) COMMUNICATION APPARATUS CAPABLE OF COMMUNICATING WITH EXTERNAL APPARATUS IN WHICH CONTENTS ARE RECORDED, AND RECEIVING METADATA OF CONTENTS

(71) Applicant: CANON KABUSHIKI KAISHA, Tokyo (JP)

(72) Inventor: Yuji Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 14/841,295

(22) Filed: Aug. 31, 2015

(65) Prior Publication Data

US 2016/0063036 A1 Mar. 3, 2016

(30) Foreign Application Priority Data

Sep. 3, 2014 (JP) .................................. 2014-179322

(51) Int. Cl.
*G06F 17/30* (2006.01)
*G06F 3/041* (2006.01)
*H04N 5/232* (2006.01)

(52) U.S. Cl.
CPC ...... *G06F 17/30268* (2013.01); *G06F 3/0412* (2013.01); *G06F 3/0416* (2013.01); *G06F 17/3028* (2013.01); *H04N 5/23206* (2013.01); *H04N 5/23293* (2013.01)

(58) Field of Classification Search
CPC ........... G06F 17/30268; G06F 17/3028; G06F 3/0416; G06F 3/0412; H04N 5/23293; H04N 5/23206
See application file for complete search history.

(56) References Cited

U.S. PATENT DOCUMENTS

| 6,629,104 B1* | 9/2003 | Parulski ............ G06F 17/30265 348/231.2 |
| 2005/0160067 A1* | 7/2005 | Sohma .............. G06F 17/30265 |
| 2006/0271550 A1* | 11/2006 | Chadha ............. G06F 17/30905 |
| 2009/0007188 A1* | 1/2009 | Omernick .......... H04N 21/2402 725/62 |
| 2012/0117599 A1* | 5/2012 | Jin ................... H04N 21/41407 725/41 |
| 2013/0227083 A1 | 8/2013 | Kim et al. |

FOREIGN PATENT DOCUMENTS

| JP | 2003219346 A | 7/2003 |
| JP | 2009087063 A | 4/2009 |
| JP | 2013-162303 A | 8/2013 |

* cited by examiner

*Primary Examiner* — Gevell Selby (74) *Attorney, Agent, or Firm* — Canon U.S.A., Inc. IP Division (57) ABSTRACT

A communication apparatus includes a communication unit that requests image data from an external apparatus and receives image data from an external apparatus in response to the request, a display control unit that displays the received image data on a display unit, and a receiving unit that receives an instruction for selecting displayed image data. The communication unit further requests, from the external apparatus, metadata of selected image data and receives the metadata without receiving the image data. The metadata is recorded in a header area of a file containing the image data stored in the external apparatus.

15 Claims, 7 Drawing Sheets

| API NAME | REQUEST (ARGUMENT) | RESPONSE | DESCRIPTION |
|---|---|---|---|
| RequestProductInfo | NONE | · PRODUCT NAME<br>· MANUFACTURER NAME<br>· FIRMWARE VERSION<br>· SERIAL NUMBER | ACQUIRE PRODUCT INFORMATION FOR DIGITAL CAMERA |
| RequestMemoryInfo | NONE | · STORAGE AREA ID<br>· STORAGE CAPACITY<br>· FREE CAPACITY<br>· NUMBER OF STORED CONTENTS | ACQUIRE INFORMATION ABOUT STORAGE AREA OF DIGITAL CAMERA |
| RequestContentInfo | · STORAGE AREA ID<br>· CONTENT FORMAT TYPE<br>· NUMBER OF CONTENT FILES TO BE REQUESTED | · CONTENT ID<br>· CONTENT FILE NAME<br>· CONTENT FILE SIZE<br>· DATE AND TIME OF CONTENT FILE GENERATION | ACQUIRE CONTENT IDS AND BASIC INFORMATION FOR CONTENT FILES STORED IN STORAGE AREA OF DIGITAL CAMERA |
| RequestContent | · CONTENT ID<br>· CONTENT FILE SIZE | · CONTENT FILE | ACQUIRE CONTENT FILE |
| RequestContentDetailInfo | · CONTENT ID | · DETAILED INFORMATION FOR CONTENT | ACQUIRE DETAILED INFORMATION FOR CONTENT FILE |
| ⋮ | | | |

COMMUNICATION APPARATUS CAPABLE OF COMMUNICATING WITH EXTERNAL APPARATUS IN WHICH CONTENTS ARE RECORDED, AND RECEIVING METADATA OF CONTENTS

BACKGROUND

Field

Aspects of the present invention generally relate to a communication apparatus that communicates with an external apparatus in which contents are recorded, and receiving metadata of the contents.

Description of the Related Art

In recent years, a digital camera and a mobile phone are wirelessly connected, and functions of the digital camera are used from the mobile phone. For example, Japanese Patent Application Laid-Open No. 2013-162303 discusses a system in which a digital camera and a mobile phone are connected via a wireless local area network (LAN), and images recorded in the digital camera are remotely browsed by operating the mobile phone.

In the system discussed in Japanese Patent Application Laid-Open No. 2013-162303, it may be possible for the mobile phone not only to simply browse images or thumbnails of images but also to receive image data from the digital camera and store the image data. In such a case, for example, it may be possible to use metadata (date of imaging, data size, etc.) of the image data as a criterion for determining whether to store an image. More specifically, there may be a usage scene in which, while a user is browsing an image or a thumbnail of an image, the user confirms the metadata of the image and determines whether to store the image. To confirm the metadata from the mobile phone, it is necessary for the digital camera to read and analyze a header of the image data and then transmit required information to the mobile phone. However, the user does not necessarily grasp how the metadata is recorded and how the metadata can be browsed from the mobile phone. This point is not taken into consideration at all by the technique discussed in Japanese Patent Application Laid-Open No. 2013-162303.

SUMMARY

According to an aspect of the present invention, a communication apparatus includes a communication unit configured to request image data from an external apparatus and to receive image data from the external apparatus in response to the request, a display control unit configured to display the image data on a display unit, and a receiving unit configured to receive an instruction for selecting image data displayed by the display control unit. The communication unit further requests, from the external apparatus, metadata of the selected image data and receives the metadata without receiving the image data. The metadata is recorded in a header area of a file containing the image data stored in the external apparatus.

Further features of the present disclosure will become apparent from the following description of exemplary embodiments with reference to the attached drawings.

DESCRIPTION OF THE EMBODIMENTS

Exemplary embodiments will be described in detail below with reference to the accompanying drawings.

The exemplary embodiments described below are examples of methods for achieving aspects of the present invention, and may be suitably corrected or modified depending on the configuration and various conditions of an apparatus to which aspects of the present invention are to be applied. Further, the exemplary embodiments can also be suitably combined.

<Configuration of Digital Camera 100>

Figure 1A:
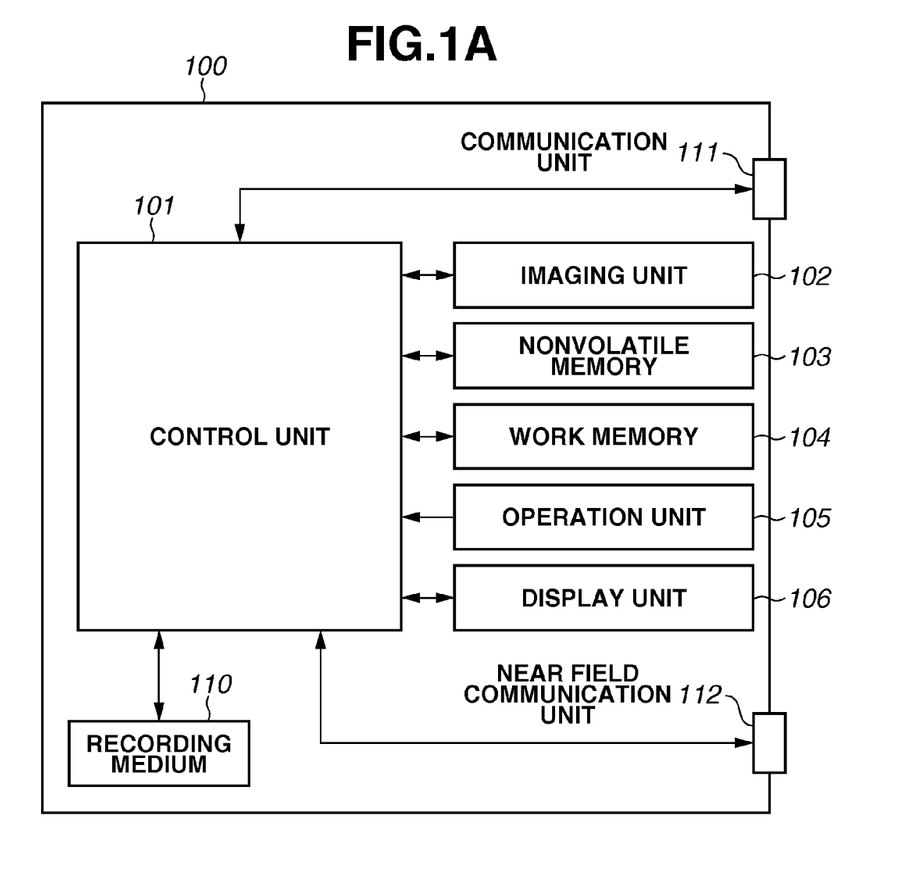
FIG. 1A is a block diagram illustrating a digital camera according to a first exemplary embodiment.

FIG. 1A is a block diagram illustrating an example of a configuration of a digital camera 100 serving as an example of a communication apparatus according to a first exemplary embodiment. Although a digital camera will be described below as an example of a communication apparatus, the communication apparatus is not limited thereto. For example, the communication apparatus may be a portable media player or an information processing apparatus such as what is called a tablet device or a personal computer.

A control unit 101 controls each portion of the digital camera 100 based on an input signal and a program (described below). Instead of controlling the entire apparatus by the control unit 101, a plurality of hardware components may perform different pieces of processing to control the entire apparatus.

An imaging unit 102 includes an optical lens unit, an optical system (for controlling diaphragm, zoom, and focus), and an image sensor for converting light (image) introduced via the optical lens unit into an electrical image signal. As the image sensor, a complementary metal oxide semiconductor (CMOS) sensor or a charge coupled device (CCD) sensor is used. Under control of the control unit 101, the imaging unit 102 converts object light focused by a lens included in the imaging unit 102 into an electrical signal via the image sensor, performs noise reduction processing, and outputs digital data as image data. In the digital camera 100 according to the present exemplary embodiment, image data is recorded in a recording medium 110 by complying with the Design Rule for Camera File system (DCF) standard.

A nonvolatile memory 103 is an electrically erasable/rewritable nonvolatile memory, and stores programs (described below) to be executed by the control unit 101.

A work memory 104 is used as a buffer memory for temporarily storing image data captured by the imaging unit 102, as an image display memory for a display unit 106, and as a work area for the control unit 101.

An operation unit 105 is used to receive instructions from a user to the digital camera 100. The operation unit 105 includes, for example, a power button for an instruction to turn power of the digital camera 100 ON and OFF, a release switch for an instruction to capture an image, and a playback button for an instruction to reproduce image data. The operation unit 105 further includes an operation member such as a dedicated connection button for starting communication with an external apparatus via a communication unit 111 (described below). The operation unit 105 further includes a touch panel to be formed on the display unit 106 (described below). The release switch includes switches SW1 and SW2. SW1 is turned ON when the release switch is half-pressed. Thereby, the operation unit 105 receives an instruction to perform image-pickup preparations such as automatic focus (AF) processing, automatic exposure (AE) processing, automatic white balance (AWB) processing, and flash preliminary emission (EF) processing. SW2 is turned ON when the release switch is fully pressed. This receives an instruction for image capturing.

The display unit 106 displays a view finder image at the time of image capturing, displays captured image data, and displays texts for interactive operations. The digital camera 100 does not necessarily need to include the display unit 106. The digital camera 100 needs at least to be connectable with the internal or external display unit 106 and to have a function for controlling display of the display unit 106.

The recording medium 110 can record as a file the image data output from the imaging unit 102. As a file management system for the digital camera 100, for example, the File Allocation Table (FAT) may be employed. The recording medium 110 may be detachably attached to the digital camera 100 or built in the digital camera 100. More specifically, the digital camera 100 needs at least to have a method for accessing the recording medium 110.

The communication unit 111 is an interface for connecting with an external apparatus. The digital camera 100 according to the present exemplary embodiment can exchange data with the external apparatus via the communication unit 111. For example, the image data generated by the imaging unit 102 can be transmitted to the external apparatus via the communication unit 111. In the present exemplary embodiment, the communication unit 111 includes an interface for performing communication with an external apparatus via what is called wireless LAN complying with the Institute of Electrical and Electronics Engineers (IEEE) 802.11 standard. The control unit 101 controls the communication unit 111 to achieve communication with the external apparatus via wireless LAN. In communication via wireless LAN, the external apparatus may be connected directly or via an access point. As a protocol for data communication, for example, Hyper Text Transfer Protocol (HTTP) can be used. Picture Transfer Protocol over Internet Protocol (PTP/IP) can also be used. The communication method is not limited to wireless LAN, and, wireless communication systems such as the infrared transmission method, the Bluetooth® communication method, and the Wireless Universal Serial Bus (USB) may be employed. Further, wired connections such as a USB cable, High-Definition Multimedia Interface® (HDMI), IEEE 1394, and Ethernet® may be employed.

A near field wireless communication unit 112 includes, for example, an antenna for wireless communication, a modulation/demodulation circuit for processing a wireless signal, and a communication controller. The near field wireless communication unit 112 outputs a modulated wireless signal from the antenna and demodulates a wireless signal received by the antenna to achieve near field wireless communication, more specifically, near field wireless communication complying with International Organization for Standardization/International Electrotechnical Commission (ISO/IEC) 18092 (what is called near field communication (NFC)). In addition, near field wireless communication complying with wireless communication methods such as the infrared transmission method, the Bluetooth® communication method, and the Wireless USB may be employed. When employing the Bluetooth® communication method in the near field wireless communication unit 112, for example, Bluetooth® Low Energy version 4.0 that provides low power consumption may be employed. This Bluetooth® communication provides a narrower communication range (a shorter communication distance) than wireless LAN communication. Bluetooth® communication provides a lower transmission rate than wireless LAN communication whereas Bluetooth® communication provides lower power consumption than wireless LAN communication.

The near field wireless communication unit 112 according to the present exemplary embodiment is disposed on a side portion of the digital camera 100.

In the present exemplary embodiment, the digital camera 100 starts communication with a smart device 200 (described below) via the communication unit 111 and then connects with the smart device 200. The communication unit 111 of the digital camera 100 according to the present exemplary embodiment has two different operation modes: the AP mode in which the digital camera 100 operates as an access point in the infrastructure mode, and the CL mode in which it operates as a client in the infrastructure mode. Operating the communication unit 111 in the CL mode enables the digital camera 100 according to the present exemplary embodiment to operate as a client apparatus (hereinafter referred to as a CL apparatus) in the infrastructure mode. When the digital camera 100 operates as a CL apparatus, the digital camera 100 connects with an access point apparatus (hereinafter referred to as an AP apparatus) in the periphery to be able to participate in a network formed by the AP apparatus. Further, operating the communication unit 111 in the AP mode enables the digital camera 100 in the present exemplary embodiment to operate as a simplified AP (hereinafter referred to as a simple AP), a type of AP, having limited functions. When the digital camera 100 operates as a simple AP, the digital camera 100 itself forms a network. An apparatus in the periphery of the digital camera 100 recognizes the digital camera 100 as an AP apparatus, and can participate in the network formed by the digital camera 100. A program for operating the digital camera 100 as described above is stored in the nonvolatile memory 103.

The digital camera 100 according to the present exemplary embodiment is a type of access point, and a simple AP that does not have a gateway function for transmitting data received from a CL apparatus to an Internet provider. Therefore, even if the digital camera 100 receives data from another apparatus participating in the network formed by the digital camera 100 itself, the digital camera 100 cannot transmit the data to a network such as the Internet.

Figure 1B:
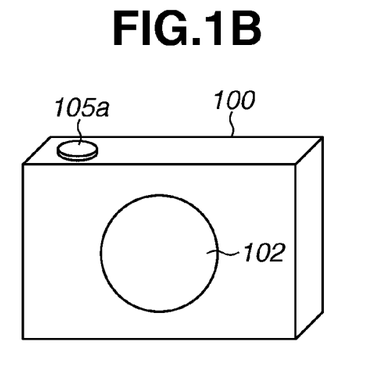
FIGS. 1B and 1C illustrate outer appearances of the digital camera according to the first exemplary embodiment.
Figure 1C:
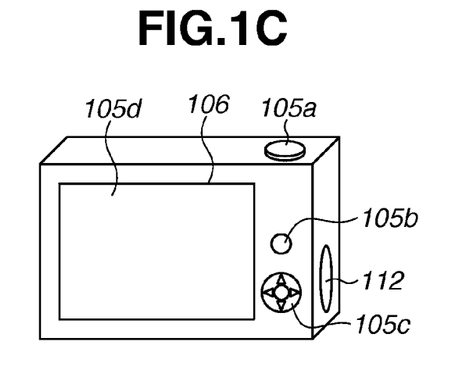

Outer appearances of the digital camera 100 will be described below. FIGS. 1B and 1C illustrate examples of outer appearances of the digital camera 100. A release switch 105*a*, a playback button 105*b*, a direction key 105*c*, and a touch panel 105*d* are operation members included in the operation unit 105. An image obtained as a result of imaging by the imaging unit 102 is displayed on the display unit 106.

This completes descriptions of the digital camera 100.

<Configuration of Smart Device 200>

Figure 2:
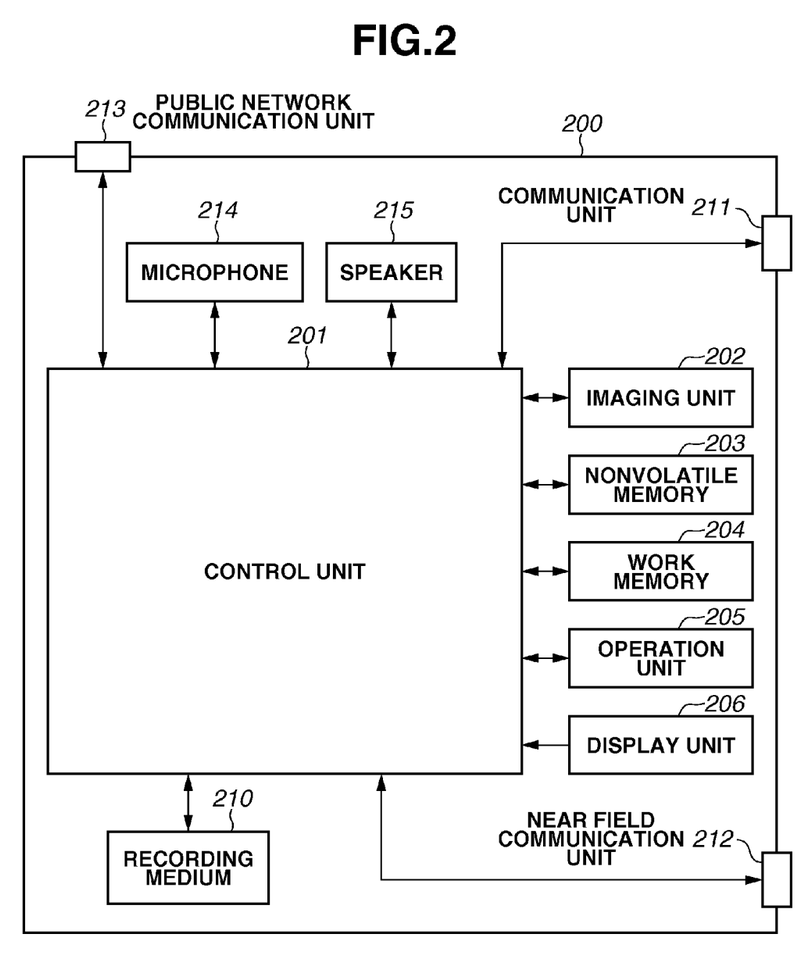
FIG. 2 is a block diagram illustrating a configuration of a smart device according to the first exemplary embodiment.

FIG. 2 is a block diagram illustrating an example of a configuration of the smart device 200 serving as an example of an information processing apparatus according to the present exemplary embodiment. A smart device means a smart phone or a tablet device. Although a smart device will be described below as an example of an information processing apparatus, the information processing apparatus is not limited thereto. For example, the information processing apparatus may be a digital camera, a printer, a television, or a personal computer having a wireless function.

A control unit 201 controls each portion of the smart device 200 according to an input signal and a program (described below). Instead of controlling the entire apparatus by the control unit 201, a plurality of hardware components may perform different pieces of processing to control the entire apparatus.

An imaging unit 202 converts object light focused by a lens included in the imaging unit 202 into an electrical signal, performs noise reduction processing, and outputs digital data as image data. After the captured image data is stored in a buffer memory, the control unit 201 performs predetermined calculations on the image data and then records the data in a recording medium 210.

A nonvolatile memory 203 is an electrically erasable/rewritable nonvolatile memory. The nonvolatile memory 203 stores an operating system (OS) that is basic software executed by the control unit 201, and records applications for achieving applied functions in collaboration with the OS. In the present exemplary embodiment, the nonvolatile memory 203 stores an application for communicating with the digital camera 100.

A work memory 204 is used as an image display memory for the display unit 206 and a work area for the control unit 201.

An operation unit 205 is used to receive an instruction from the user to the smart device 200. The operation unit 205 includes operation members such as a power button for an instruction to turn power of the smart device 200 ON and OFF and a touch panel formed on the display unit 206.

The display unit 206 displays image data and texts for interactive operations. The smart device 200 does not necessarily need to have the display unit 206. The smart device 200 needs at least to be connectable with the display unit 206, and to have a function for controlling display of the display unit 206.

The recording medium 210 can record image data output from the imaging unit 202. As a file management system for the smart device 200, for example, the FAT may be employed. The recording medium 210 may be detachably attached to the smart device 200 or built in the smart device 200. More specifically, the smart device 200 needs at least to have a method for accessing the recording medium 210.

A communication unit 211 is an interface for connecting with an external apparatus. The smart device 200 according to the present exemplary embodiment can exchange data with an external apparatus via the communication unit 211. For example, image data generated by the imaging unit 202 can be transmitted to an external apparatus via the communication unit 211. In the present exemplary embodiment, the communication unit 211 includes an interface for performing communication with an external apparatus via what is called wireless LAN complying with the IEEE 802.11 standard. The control unit 201 controls the communication unit 211 to achieve communication with an external apparatus via wireless LAN. In communication via wireless LAN, an external apparatus may be connected directly or via an access point. As a data communication protocol, for example, HTTP and PTP/IP can be used. The communication method is not limited to wireless LAN. For example, wireless communication systems such as the infrared transmission method, the Bluetooth® communication method, and the Wireless USB may be employed. Further, wired connections such as a USB cable, HDMI®, IEEE 1394, and Ethernet® may be employed.

A near field wireless communication unit 212 includes, for example, an antenna for wireless communication, a modulation/demodulation circuit for processing a wireless signal, and a communication controller. The near field wireless communication unit 212 outputs a modulated wireless signal from the antenna and demodulates a wireless signal received by the antenna to achieve non-contact near field wireless communication, more specifically, near field wireless communication complying with the ISO/IEC 18092 (what is called NFC) standard. In addition, near field wireless communication complying with wireless communication methods such as the infrared transmission method, the Bluetooth® communication method, and the Wireless USB may be employed. When employing the Bluetooth® communication method in the near field wireless communication unit 212, for example, Bluetooth (registered trademark) Low Energy version 4.0 that provides low power consumption may be employed. This Bluetooth (registered trademark) communication provides a narrower communication range (a shorter communication distance) than wireless LAN communication. Bluetooth® communication provides a lower transmission rate than wireless LAN communication whereas Bluetooth® communication provides lower power consumption than wireless LAN communication.

A public network communication unit 213 is an interface used to perform public wireless communication. The smart device 200 can make a telephone call to other apparatuses via the public network communication unit 213. In this case, the control unit 201 inputs and outputs a sound signal via a microphone 214 and a speaker 215, respectively, to achieve a telephone call. In the present exemplary embodiment, the public network communication unit 213 enables connection with a public network by complying with the Wideband Code Division Multiple Access (Universal Mobile Telecommunications System) (W-CDMA (UMTS)) standard or the Long Term Evolution (LTE) standard. The communication unit 211 and the public network communication unit 213 may share one antenna.

This completes descriptions of the smart device 200.

<APIs for Controlling Digital Camera from External Apparatus>

Figure 3A:
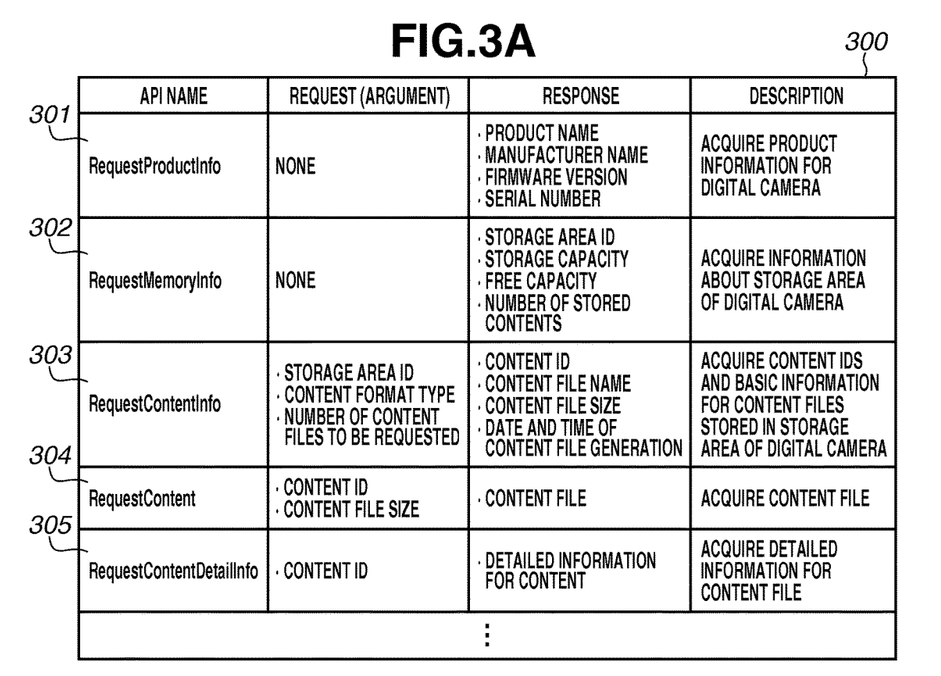
FIG. 3A illustrates Application Programming Interfaces (APIs) disclosed to external apparatuses by the digital camera according to the first exemplary embodiment.

FIG. 3A illustrates Application Programming Interfaces (APIs) for controlling the digital camera 100 from an external apparatus.

With the digital camera 100 according to the present exemplary embodiment, APIs that can be controlled from an external apparatus such as the smart device 200 are disclosed. The APIs are implemented on both the digital camera 100 and an operating system (OS) of the smart device 200. The use of the disclosed APIs allows a designer of an application (to be loaded into the external apparatus) to easily implement desired functions without being conscious of detailed procedures. For example, simply by calling an API implemented in the OS, the application can acquire device information recorded in the nonvolatile memory 103 of the digital camera 100 and a content file stored in the recording medium 110. A content file is generated by the digital camera 100 and stored in the recording medium 110 or the nonvolatile memory 103. In the present exemplary embodiment, content files refer to still image files and moving image files. Markup language files such as audio files, music files, and hypertext markup language (HTML) files may be offered to the external apparatus. To simplify descriptions, a still image file will be mainly described below.

The digital camera 100 prestores the APIs as programs in the nonvolatile memory 103. When communication between the digital camera 100 and the external apparatus is established via the communication unit 111, the digital camera 100 loads programs for executing APIs into the work memory 104 and then waits for an API request from the external apparatus. When the control unit 101 detects that an API has been requested from the external apparatus, the control unit 101 performs processing according to the type of the API, and returns a result of the processing as a response to the external apparatus. The API is executed on a communication protocol specified by the digital camera 100, and the external apparatus communicates with the digital camera 100 by using the specified communication protocol to request an API. Although the present exemplary embodiment will be describe below on the assumption that the APIs are executed on Hyper Text Transfer Protocol (HTTP), other communication protocols (for example, PTP/IP) may be employed.

In HTTP, the execution of an API is basically implemented by the following procedures. More specifically, the external apparatus describes the API name and necessary arguments as texts in an HTTP request body, and transmits the texts to request execution of the API by transmitting it to the digital camera 100 by using a GET method or a POST method to request execution of the API. In response to this request, the digital camera 100 adds an execution result to the HTTP response body, and returns the text as a response to the external apparatus to provide the external apparatus with the execution result of the API. In the following descriptions, performing this processing for transmitting a request by using an API is referred to as "calling an API".

An API list 300 in FIG. 3A illustrates types of APIs operating in the above-described mechanism, provided by the digital camera 100 and descriptions. The following APIs are examples, and APIs other than the following may be provided as APIs for controlling the digital camera 100.

An API 301 is an API for acquiring product information for the digital camera 100. When the external apparatus transmits to the digital camera 100 a request on the API name "RequestProductInfo" with no argument, the external apparatus acquires the product name, the manufacturer name, the firmware version, and the serial number of the digital camera 100, as a response from the digital camera 100. The product name is the name of the product of the digital camera 100. The manufacturer name is the name of the manufacturer of the digital camera 100. The firmware version is the version number of a program for controlling the digital camera 100, stored in the nonvolatile memory 103. The serial number is a unique number that enables identification of the digital camera 100.

An API 302 is an API for acquiring information about a storage area of the digital camera 100. When the external apparatus transmits a request on the API name "RequestMemoryInfo" to the digital camera 100, the external apparatus acquires the storage area identifier (ID), the storage capacity, the free capacity, and the number of stored content files of the digital camera 100, as a response from the digital camera 100. This request is issued with no argument. The storage area ID indicates an identification assigned to each storage area for storing content files generated by the digital camera 100. An area for storing content files is, for example, the recording medium 110 of the digital camera 100, and an ID is assigned to the recording medium 110. When a plurality of recording media can be inserted, different IDs are assigned to respective recording media. The storage capacity refers to the maximum size of the storage area for storing content files. The free capacity refers to the size of an area in the storage area, where no content file is stored. The number of stored contents refers to the total number of content files stored in the storage area.

An API 303 is an API for acquiring content IDs and management information for content files stored in the storage area of the digital camera 100. The management information is recorded in a management area (an area allocated for each directory, what is called a directory entry) for managing information about files in a directory for recording contents and information about the directory. When the external apparatus transmits to the digital camera 100 a request on the API name "RequestContentInfo" with argument specifications of the storage area ID acquired via the API 302, the content format type, and the number of content files to be requested, the external apparatus can acquire the following information as a response from the digital camera 100: a content ID, a file name, a file size, and date and time of generation of a content file stored in the storage area of the digital camera 100. The content ID refers to an ID automatically assigned by the control unit 101 of the digital camera 100 to identify each individual content file. In addition to the above-described IDs for file management in the digital camera 100, an ID to be temporarily used during communication with the smart device 200 using the API 303 may be separately assigned and used as a content ID.

An API 304 is an API for acquiring a content file stored in the storage area of the digital camera 100. When the external apparatus transmits to the digital camera 100 a request on the API name "RequestContent" with argument specifications of the content ID and the content size, the external apparatus acquires a content file as a response from the digital camera 100. As the content size, for example, the original size or the reduced size can be specified. The digital camera 100 generates a content file according to the specified size, and returns the file as a response to the external apparatus. In the present exemplary embodiment, the external apparatus can specify whether a still image file is to be acquired in the original size or in the thumbnail size. When the original size is specified, the external apparatus acquires image data recorded in the digital camera 100. When the thumbnail size is specified, the external apparatus acquires the thumbnail recorded in the header of the image data recorded in the digital camera 100.

An API 305 is an API for acquiring detailed information (what is called metadata) of a content file stored in the storage area of the digital camera 100. When the external apparatus transmits to the digital camera 100 a request on the API name "RequestContentDetailInfo" with an argument specification of the content ID, the external apparatus can acquire detailed information for the content corresponding to the specified content ID. When using this API, the external apparatus acquires detailed information for the content without receiving the content itself. The detailed information according to the present exemplary embodiment is what is called metadata, for example, the Exchangeable image file format (Exif) information in a still image file. The Exif refers to an image metadata format for digital cameras established by Japan Electronic Industry Development Association (JEIDA). Since the Exif information is recorded in the header of image data, it is necessary to read and analyze the header of the image data to grasp its contents. After implementation of this API, the digital camera 100 analyzes the header of image data and the smart device 200 can acquire metadata in an interpretable format. Thus, it is unnecessary for the smart device 200 to analyze Exif. More specifically, for example, even if the smart device 200 does not have a function of analyzing Exif of image data received by using the API 304, the smart device 200 can acquire metadata from the digital camera 100. A certain amount of time is required to analyze the header of image data. Therefore, in comparison with the management information recorded in the directory entry, it takes longer time until data transmission becomes ready.

Figure 3B:
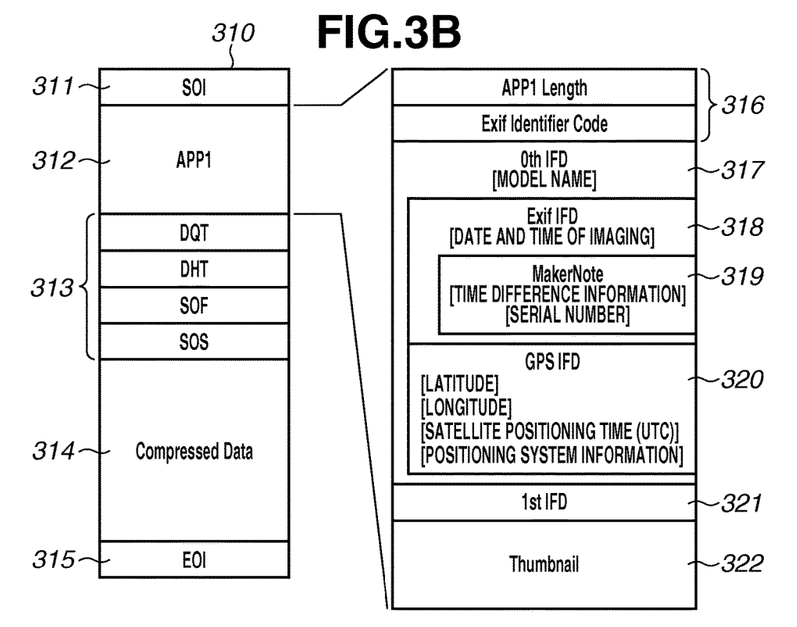
FIG. 3B is a schematic diagram illustrating a structure of image data according to the first exemplary embodiment.

The configuration of image data according to the present exemplary embodiment will be described below. FIG. 3B is a schematic diagram illustrating the configuration of image data according to the present exemplary embodiment. The image data is generated, for example, by the digital camera 100 and is recorded in the data recording area of the recording medium 110.

The data structure of an image file according to the present exemplary embodiment will be described below. Although Exif-Joint Photographic Experts Group (JPEG) is used as an image file format, formats having a data structure enabling recording metadata in the image file may be used, such as the Exif-Tagged Image File Format (TIFF), RAW image, and moving image formats.

Referring to an Exif-JPEG data block 310 illustrated in FIG. 3B, an Start Of Image (SOI) data block 311 is a marker indicating the start of the Exif-JPEG data block 310. An application1 (APP1) data block 312 is an application marker equivalent to the header of the Exif-JPEG data block 310. A data block 313 includes a quantization table (Define Quantization Table (DQT)), a Huffman table (Define Huffman Table (DHT)), a frame start marker (Start Of Frame (SOF)), and a scanning start marker (Start Of Scan (SOS)). A Compressed Data block 314 is compressed data of a main image. An End Of Image (EOI) data block 315 is a marker indicating the end of the Exif-JPEG data block 310.

The APP1 data block 312 includes data blocks 316 to 322 as illustrated in FIG. 3B. The data block 316 includes APP1 Length indicating the size of the APP1 data block 312, and Exif Identifier Code indicating the identification code of the APP1 data block 312. A 0th Image File Directory (IFD) data block 317 records attached information related to the compressed main image. For example, the 0th IFD data block 317 includes information about the model name of the digital camera used for image capturing. The 0th IFD data block 317 partially includes an Exif IFD data block 318 and a Global Positioning System (GPS) IFD data block 320.

The Exif IFD data block 318 includes a tag related to the Exif version, a tag related to the characteristics and structure of the image data, a tag related to the date and time of imaging, and a tag related to imaging conditions such as the shutter speed and the lens focal point distance. The Exif IFD data block 318 further includes a MakerNote data block 319. The MakerNote data block 319 records information specific to the maker that has generated the file. For example, the MakerNote data block 319 includes time difference information, and a serial number indicating a unique number of the digital camera 100 used for imaging. The information recorded in the MakerNote data block 319 is based on specifications for each maker. Therefore, unless format specifications for data recorded in the MakerNote data block 319 are disclosed, it is difficult to grasp information recorded in the MakerNote data block 319, from products and applications from other makers. The API 305 can also be used to solve such a problem. More specifically, if the API 305 is used, the digital camera 100 analyzes the MakerNote data block 319 and the smart device 200 can acquire data in a recognizable format. Therefore, even if an apparatus or application using APIs does not have a function of analyzing the MakerNote data block 319, the apparatus or application can grasp the contents of information recorded in the MakerNote data block 319.

The GPS IFD data block 320 includes tags related to GPS information. These tags record the position information (latitude and longitude) and the satellite positioning time (UTC) used in the present exemplary embodiment.

A first IFD data block 321 records attached information related to a thumbnail image. A Thumbnail 322 is image data of a thumbnail.

This completes descriptions of the structure of image data according to the present exemplary embodiment.

<System Sequences>

The following describes procedures for browsing image data achieved through collaborative operations of the digital camera 100 and the smart device 200 according to the present exemplary embodiment.

Figure 4:
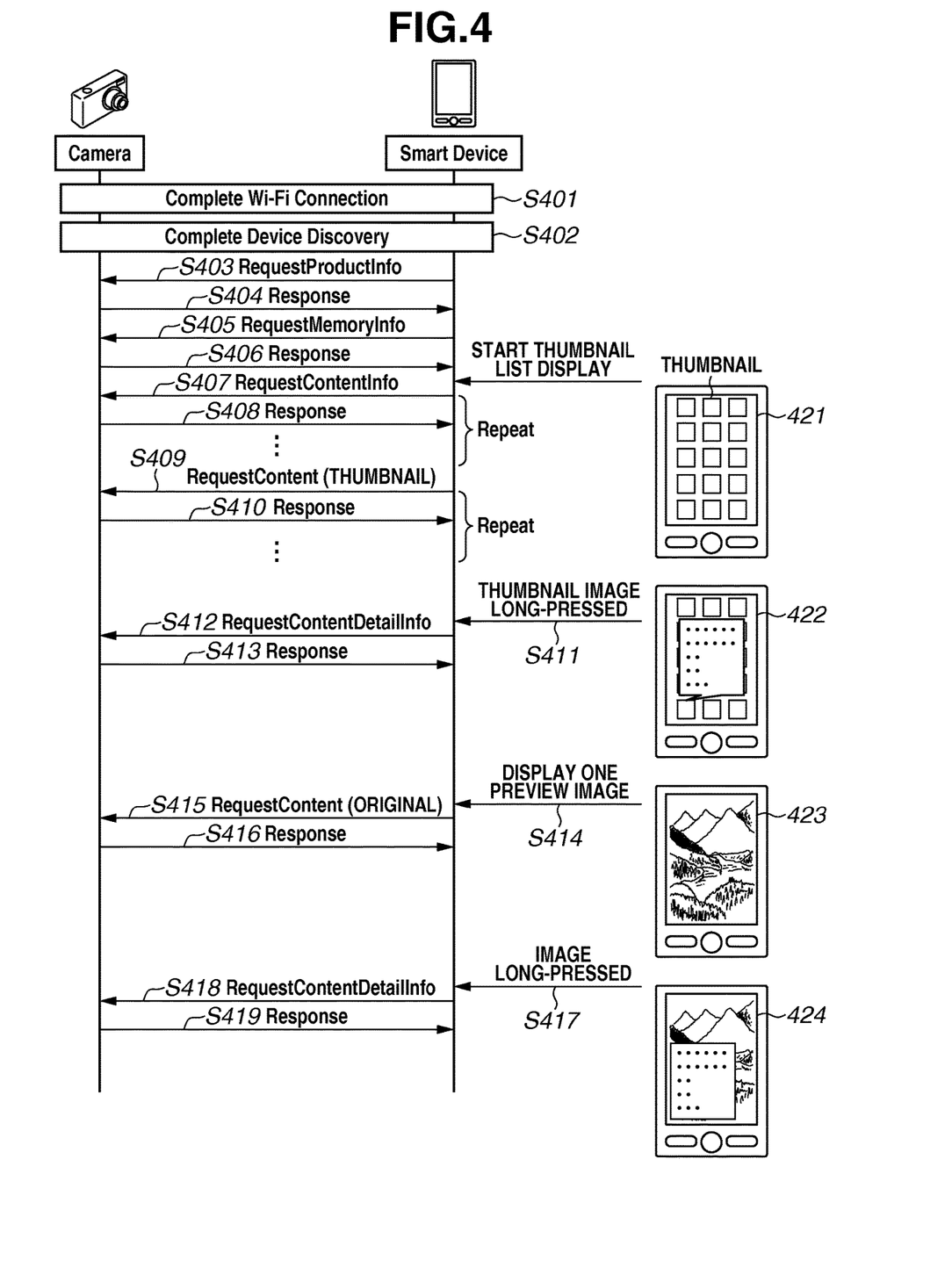
FIG. 4 is a sequence diagram of a system according to the first exemplary embodiment.

FIG. 4 is a sequence diagram illustrating procedures for browsing data achieved through collaborative operations of the digital camera 100 and the smart device 200 according to the present exemplary embodiment.

In step S401, the digital camera 100 and the smart device 200 share communication parameters and mutually participate in the same network. The network in which both the apparatuses participate may be a network generated by an access point serving as an apparatus that is different from both the apparatuses, or a network generated by either of the apparatuses operating as a simple AP. The present exemplary embodiment will be described below based on a case where the digital camera 100 operates as the simple AP to form a wireless LAN network. When the digital camera 100 operates as the simple AP, it starts periodical transmission of a beacon signal. Meanwhile, when the user gives an instruction to start connection through a menu operation on the smart device 200, the smart device 200 detects the beacon signal and participates in the wireless LAN network formed by the digital camera 100. Sharing of communication parameters is implemented when the user operates each apparatus (for example, selection of a Service Set Identifier (SSID) on the smart device 200, and a menu operation for an instruction to activate a wireless LAN function on the digital camera 100). Alternatively, the digital camera 100 may transmit the SSID and a password to the smart device 200 via near field wireless communication to share them. In this case, the wireless LAN function is automatically activated according to sharing of the SSID and password in near field wireless communication.

In step S402, the digital camera 100 and the smart device 200 mutually detect the respective communication partners via an apparatus detection protocol, and perform protocol connection for performing data communication to establish connection between the apparatuses. To mutually detect the respective communication partners, the digital camera 100 and the smart device 200 use a certain protocol, for example, Universal Plug And Play (UPnP) and Multicast Domain Name Service (mDNS). As a protocol for performing data communication, for example, PTP/IP may be employed.

In step S403, the smart device 200 calls the RequestProductInfo API for acquiring product information for the digital camera 100. More specifically, the smart device 200 transmits a request for product information to the digital camera 100.

In response to this request, in step S404, the digital camera 100 performs processing according to the Request-ProductInfo API illustrated in FIG. 3A, and returns a result of the processing to the smart device 200. Upon reception of this request, the digital camera 100 reads the product name, the manufacturer name, the firmware version, and the serial number recorded in the nonvolatile memory 103 and then transmits these pieces of information as product information to the smart device 200.

In step S405, the smart device 200 calls the RequestMemoryInfo API for acquiring information about the storage area for the digital camera 100. More specifically, the smart device 200 transmits a request for information about the storage area to the digital camera 100.

In response to this request, in step S406, the digital camera 100 performs processing according to the RequestMemoryInfo API illustrated in FIG. 3A and then returns a result of the processing to the smart device 200. More specifically, the digital camera 100 transmits the storage area ID, the storage capacity, the free capacity, and the number of stored contents, to the smart device 200 as information about the storage area.

In step S407, to display a thumbnail list, the smart device 200 calls the RequestContentInfo API for acquiring management information for images stored in the digital camera 100. More specifically, the smart device 200 transmits to the digital camera 100 a request for management information for images stored in the digital camera 100. When calling the RequestContentInfo API in this step, the smart device 200 specifies as an argument the information about the storage area acquired in step 406. The processing in step S407 may be automatically performed upon completion of the processing in step S406, or may be performed upon reception of an instruction for displaying a thumbnail list, for example, through a user operation. FIG. 4 illustrates a case where the relevant processing is performed in response to an instruction from the user.

In response to this request, in step S408, the digital camera 100 performs processing according to the RequestContentInfo API illustrated in FIG. 3A and then returns a result of the processing to the smart device 200. More specifically, the digital camera 100 reads a content ID, a content file name, a content file size, and date and time of generation of a content file from the directory entry of the directory where an image is stored, and then transmits these pieces of information to the smart device 200.

The processing in steps S407 and S408 is repeated the number of times that equals the number of thumbnails to be displayed on the display unit 206 of the smart device 200. In the example illustrated in FIG. 4, 15 thumbnails acquired in the following steps are displayed on one screen. In this case, steps S407 and S408 are repeated 15 times to acquire management information for images corresponding to the thumbnails to be displayed on one screen. The smart device 200 may acquire a plurality of pieces of management information by calling the RequestContentInfo API once. In this case, the smart device 200 specifies a range of the management information to be acquired as an argument of the RequestContentInfo API. More specifically, for example, an acquisition target range 1-15 is specified. When a range is specified in this way, the digital camera 100 returns 15 pieces of management information (management information for the first image to management information for the 15th image) as a response, among pieces of management information for images managed in a predetermined order. For example, the digital camera 100 returns management information in order of generation of images.

In step S409, the smart device 200 calls the RequestContent API for acquiring a display target thumbnail based on the management information for the image received from the digital camera 100 in step S408. More specifically, the smart device 200 transmits to the digital camera 100 a request for the thumbnail of the image with an argument specification of the ID of the image of which the image information has been acquired.

In response to this request, in step S410, the digital camera 100 performs processing according to the RequestContent API illustrated in FIG. 3A and then returns the relevant thumbnail data to the smart device 200. More specifically, the digital camera 100 analyzes the header of the image determined based on the ID of the image included in the argument of the called API, reads thumbnail data, and transmits the data to the smart device 200.

Steps S409 and S410 are repeated until all of display target thumbnails are acquired. Each of thumbnails acquired in the processing in steps S409 and S410 is sequentially displayed on the display unit 206 of the smart device 200 without waiting for completion of the repetitive processing. As a result, a thumbnail list such as a screen 421 is displayed on the display unit 206 of the smart device 200.

Management information and a thumbnail for an image other than the images corresponding to the thumbnails displayed in the screen 421 can be acquired by performing the processing in steps S407 to S410 when an instruction for displaying another thumbnail is input. In the thumbnail list screen, the user can input an instruction for browsing other thumbnails, for example, with a touch operation on the touch panel. The thumbnail list is updated in the following way. For example, in response to an upward drag operation or a flick operation, the currently displayed thumbnail list is upwardly scrolled out and the following thumbnail group is scrolled in from the bottom upward. In this case, the management information and thumbnails of the following thumbnail group are acquired through the processing in steps S407 to S410.

In a state where a thumbnail list is displayed, the user can select any one thumbnail via the operation unit 205 to preview the main image and confirm metadata. The following descriptions of operations will be made based on a case where a touch panel is used as the operation unit 205.

In step S411, the smart device 200 receives an instruction for displaying detailed information for the image corresponding to any one thumbnail from the user. For example, the user presses the display area of a thumbnail for a predetermined time period (what is called long press) to input an instruction for displaying detailed information for the image corresponding to the relevant thumbnail. A long-press operation is an example and may be replaced with other operation, for example, tapping a thumbnail, double-tapping it (tapping it twice within a predetermined time period), and tapping it with two fingers.

Upon reception of the instruction for displaying detailed information for the image corresponding to any one thumbnail from the user, in step S412, the smart device 200 calls the RequestContentDetailInfo API for acquiring detailed information for the selected image. More specifically, the smart device 200 transmits to the digital camera 100 a request on detailed information for the image identified by the image ID with an argument specification of the image ID corresponding to the thumbnail selected in step S411 by the user.

In response to this request, then in step S413, the digital camera 100 performs processing according to the RequestContentDetailInfo API illustrated in FIG. 3A, and returns to the smart device 200 detailed information for the image instead of the image itself. Based on the detailed information for the image received from the digital camera 100, the smart device 200 displays detailed information for the selected image. The information to be displayed includes, for example, the imaging mode, the date and time of imaging, the Av value, the Tv value, and the ISO value. As a result, as illustrated in a screen 422, metadata of the image is displayed on the thumbnail list on the display unit 206 of the smart device 200. After the user selects a thumbnail in step S411, the processing in steps S412 and S413 is automatically performed in the background. Therefore, the user can confirm metadata of an image in the digital camera 100 with the same operation feeling as in a case of confirming metadata of an image already received.

If the user selects another thumbnail in this state, steps S412 and S413 are repeated to acquire and display detailed information for the image corresponding to the relevant thumbnail. Accordingly, the displayed detailed information disappears. This is because, if detailed information is displayed for a plurality of thumbnails, the thumbnail list will become hard to see.

In step S414, the smart device 200 receives an instruction for displaying a preview of any one image of the thumbnails displayed on the screen 421 or 422. For example, based on the contents of the displayed thumbnails and the information of metadata that can be confirmed through the processing in steps S411 to S413, the user can select a desired image to give an instruction to confirm the contents of the relevant image in a larger size. To input this instruction, for example, a double-tap operation on a thumbnail may be employed. Another operation can be used as long as the operation can be distinguished from the instruction for acquiring detailed information in step S411.

Upon reception of the instruction for displaying a preview of an image, in step S415, the smart device 200 calls the RequestContent API with an argument specification of the ID of the specified image. In this case, a value indicating "Original" is used as an argument of the image size.

In response to this request, in step S416, the digital camera 100 performs processing according to the RequestContent API illustrated in FIG. 3A, and returns the image data to the smart device 200. More specifically, the digital camera 100 transmits to the smart device 200 the image data corresponding to the image ID included in the request.

Upon reception of this request, the smart device 200 displays on the display unit 206 a preview of the selected image based on the image data received from the digital camera 100. As a result, for example, one image is entirely displayed on one screen of the display unit 206 of the smart device 200 as illustrated in a screen 423.

Although step S414 is executed after execution of steps S411 to S413 to simplify descriptions, step S414 may be executed first. For the thumbnail selected in step S414, the metadata has not necessarily been acquired through the processing in steps S411 to S413. Therefore, through long-press, the smart device 200 according to the present exemplary embodiment enables displaying the metadata of the image currently displayed on one screen as illustrated in the screen 423. More specifically, upon reception of a long-press operation from the user in step S417, then in step S418, the smart device 200 calls the RequestContentDetailInfo API with an argument specification of the image ID corresponding to the currently displayed image. In step S419, the digital camera 100 analyzes the detailed information for the image identified by the image ID included in the request, and transmits a result of the analysis to the smart device 200. When the metadata of the displayed image has already been acquired in the thumbnail list screen, the smart device 100 just needs to read and display the acquired metadata. To implement reading and displaying the acquired metadata, the smart device 200 retains the metadata once acquired until the connection with the digital camera 100 is disconnected. This eliminates the need of calling the relevant API again for communication when the confirmation instruction is received again, reducing communication overhead.

While the preview display screen 424 is displayed, the user can also input an instruction for changing to the image following or preceding the currently displayed image. For example, on the touch panel included in the operation unit 105, a right flick operation enables inputting an instruction for displaying the preceding image and a left flick operation enables inputting an instruction for displaying the following image. The preceding and the following images depend on the order of images arranged according to the image IDs acquired in step S408, in other words, the display order in the thumbnail list. Upon reception of this instruction, the smart device 200 just needs to perform steps S412 to S413 similar to the case where a preview display instruction is received on the thumbnail list.

This completes descriptions of procedures for browsing image data achieved through collaborative operations of the digital camera 100 and the smart device 200 according to the present exemplary embodiment.

<Operations of Smart Device 200>

Figure 5:
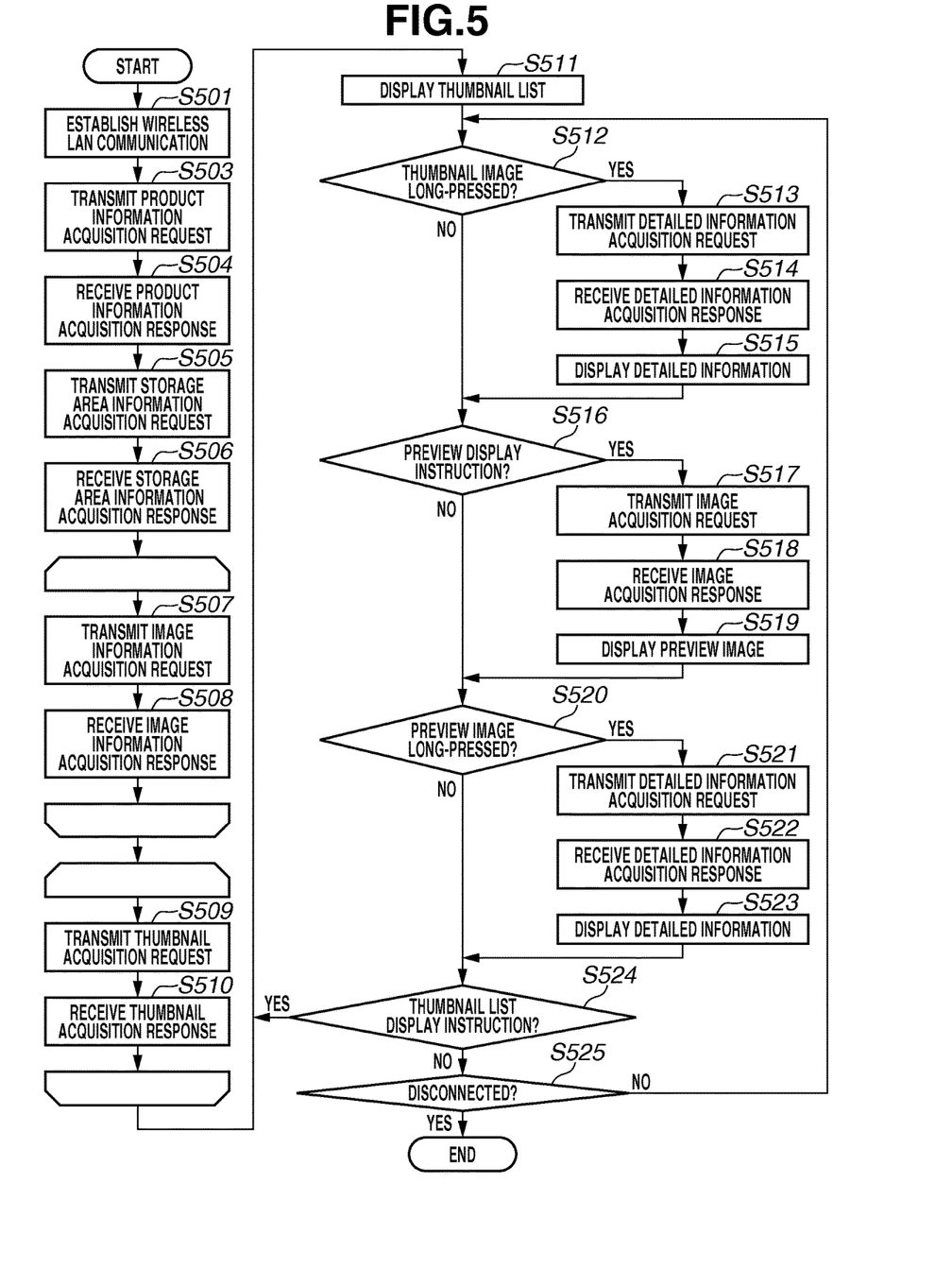
FIG. 5 is a flowchart illustrating operations of the smart device according to the first exemplary embodiment.

The following describes operations performed by the smart device 200 to achieve the procedure illustrated in FIG. 4. FIG. 5 is a flowchart illustrating operations of the smart device 200 according to the present exemplary embodiment. The processing of this flowchart is implemented when the control unit 201 loads a program stored in the nonvolatile memory 203 into the work memory 204 and then executes it. The processing of this flowchart is started, for example, upon reception of an instruction for establishing wireless LAN communication with the digital camera 100 through a user menu operation.

In step S501, the control unit 201 establishes wireless LAN communication with the digital camera 100 via the communication unit 211. Step S501 is equivalent to steps S401 and S402 illustrated in FIG. 4.

In step S503, the control unit 201 transmits a request "RequestProductInfo" for acquiring product information for the digital camera 100 to the digital camera 100 via the communication unit 211. Step S503 is equivalent to step S403 illustrated in FIG. 4.

In step S504, the control unit 201 receives a response to the request in step S503 from the digital camera 100 via the communication unit 211. More specifically, the control unit 201 receives the product name as a response to the RequestProductInfo API. Step S504 is equivalent to step S404 illustrated in FIG. 4.

In step S505, the control unit 201 transmits a request "RequestMemoryInfo" for acquiring information about the storage area of the digital camera 100 to the digital camera 100 via the communication unit 211. Step S505 is equivalent to step S405 illustrated in FIG. 4.

In step S506, the control unit 201 receives a response to the request in step S505 from the digital camera 100 via the communication unit 211. More specifically, the control unit 201 receives the storage area ID as a response to the RequestMemoryInfo API. Step S506 is equivalent to step S406 illustrated in FIG. 4.

In step S507, the control unit 201 transmits a request "RequestContentInfo" for acquiring management information for an image stored in the digital camera 100 to the digital camera 100 via the communication unit 211. Step S507 is equivalent to step S407 illustrated in FIG. 4.

In step S508, the control unit 201 receives a response to the request in step S507 from the digital camera 100 via the communication unit 211. More specifically, the control unit 201 receives the content ID (the image ID in the present exemplary embodiment) as a response to the RequestContentInfo API. Step S508 is equivalent to step S408 illustrated in FIG. 4.

The control unit 201 repeats steps S507 and S508 the number of times required to display a thumbnail list.

In step S509, the control unit 201 transmits a request "RequestContent" for acquiring a thumbnail of an image of the digital camera 100 to the digital camera 100 via the communication unit 211. Step S509 is equivalent to step S409 illustrated in FIG. 4.

In step S510, the control unit 201 receives a response to the request in step S509 from the digital camera 100 via the communication unit 211. More specifically, the control unit 201 receives content data (thumbnail data in the present exemplary embodiment) as a response to the RequestContent API. Step S510 is equivalent to step S410 illustrated in FIG. 4.

The control unit 201 repeats steps S509 and S510 the number of times required to display a thumbnail list. More specifically, the control unit 201 repeats steps S509 and S510 the number of times that is the same as the number of repetitions of steps S507 and S508.

In step S511, the control unit 201 displays thumbnail data of the images received from the digital camera 100 in step S510 in a list form on the display unit 206. Immediately after reception of a thumbnail in step S510 repeated as described above, the control unit 201 sequentially displays it. The screen 421 illustrated in FIG. 4 is an example of a thumbnail list display screen on the smart device 200. When the thumbnail list has been displayed, the control unit 201 starts receiving a metadata acquisition request instruction and a preview display instruction from the user.

In step S512, the control unit 201 determines whether an instruction for acquiring detailed information for the image corresponding to a display target thumbnail has been received. More specifically, the control unit 201 determines whether the user has long-pressed a thumbnail image by using the operation unit 205. In step S512, when the control unit 201 determines that a thumbnail image has been long-pressed (YES in step S512), the processing proceeds to step S513. On the other hand, when the control unit 201 determines that no thumbnail image has been long-pressed (NO in step S512), the processing proceeds to step S516. Step S512 is equivalent to step S411 illustrated in FIG. 4. Step S516 will be described below.

In step S513, the control unit 201 transmits a request "RequestContentDetailInfo" for acquiring detailed information for the thumbnail image long-pressed in step S512 to the digital camera 100 via the communication unit 211. In this case, the image ID corresponding to the long pressed-thumbnail is used as an argument. Step S513 is equivalent to step S412 illustrated in FIG. 4.

In step S514, the control unit 201 receives a response to the request in step S513 from the digital camera 100 via the communication unit 211. More specifically, the control unit 201 receives detailed content information (metadata of the image in the present exemplary embodiment) as a response to the RequestContentDetailInfo API. Step S514 is equivalent to step S413 illustrated in FIG. 4.

In step S515, the control unit 201 displays detailed information for the image received in step S514 on the display unit 206. On the smart device 200, detailed information is displayed in the thumbnail list so as to be superimposed onto the thumbnail list, as illustrated in the screen 422 illustrated in FIG. 4.

In step S516, the control unit 201 determines whether an instruction for performing preview display has been received. When the control unit 201 detects that the user has double-tapped any one thumbnail in the thumbnail list by using the operation unit 205, the control unit 201 determines that an instruction for performing preview display of the image corresponding to the tapped thumbnail has been received. Further, when the control unit 201 detects that the user has performed a flick operation in the right or left direction by using the operation unit 205 during preview display, the control unit 201 determines that an instruction for performing preview display of the image preceding or following the currently displayed image has been received. When the control unit 201 determines that an instruction for performing preview display has been received (YES in step S516), the processing proceeds to step S517. On the other hand, when the control unit 201 determines that an instruction for performing preview display has not been received (NO in step S516), the processing proceeds to step S520. Step S516 is equivalent to step S414 illustrated in FIG. 4. Step S520 will be described below.

In step S517, the control unit 201 transmits a request "RequestContent" for acquiring data of the image of which preview display has been specified in step S516 to the digital camera 100 via the communication unit 211. In this case, the image ID corresponding to the double-tapped thumbnail or the ID of the image preceding or following the currently previewed image is used as an argument. Step S517 is equivalent to step S415 illustrated in FIG. 4.

In step S518, the control unit 201 receives a response to the request in step S517 from the digital camera 100 via the communication unit 211. As illustrated in FIGS. 3A and 3B, the control unit 201 receives contents data (image data in the present exemplary embodiment) as a response to the RequestContent API. Step S518 is equivalent to step S416 illustrated in FIG. 4.

In step S519, the control unit 201 displays the image data received in step S518 on the display unit 206. The screen 423 illustrated in FIG. 4 is an example of a preview display screen of an image on the smart device 200.

In step S520, the control unit 201 determines whether an instruction for acquiring detailed information for the currently previewed image has been received. More specifically, the control unit 201 determines whether the currently previewed image has been long-pressed via the operation unit 205 by the user. When the control unit 201 determines that the currently previewed image has been long-pressed (YES in step S520), the processing proceeds to step S521. On the other hand, when the control unit 201 determines that the currently previewed image has not been long-pressed (NO in step S520), the processing proceeds to step S524. Step S520 is equivalent to step S417 illustrated in FIG. 4. Step S524 will be described below.

In step S521, the control unit 201 transmits a request "RequestContentDetailInfo" for acquiring detailed information for the image long-pressed in step S520 to the digital camera 100 via the communication unit 211. Step S521 is equivalent to step S418 illustrated in FIG. 4. As described in FIG. 4, if detailed information for the same image has already been received in step S514, it is not necessary to perform communication again to acquire the detailed information. Therefore, in this case, the processing skips steps S521 and S522 and proceeds to step S523.

In step S522, the control unit 201 receives a response to the request in step S521 from the digital camera 100 via the communication unit 211. As illustrated in FIGS. 3A and 3B, the control unit 201 receives detailed content information (metadata of image in the present exemplary embodiment) as a response to the RequestContentDetailInfo API. Step S522 is equivalent to step S419 illustrated in FIG. 4.

In step S523, the control unit 201 displays the detailed information for the image received in step S522 on the display unit 206. If the detailed information had already been received when the instruction has been received in step S520, the control unit 201 reads the received detailed information and displays it on the display unit 206. The screen 424 illustrated in FIG. 4 is an example of a detailed information display screen during preview display of an image on the smart device 200. Then, the processing proceeds to step S524.

In step S524, the control unit 201 determines whether a thumbnail list display instruction has been received from the user. This instruction is received during preview display. For example, when the control unit 201 enters a preview display state, the control unit 201 displays an image on one screen and a button for returning to the thumbnail list. When the user selects this button, an instruction for returning to the thumbnail list screen can be input. When the control unit 201 determines that the thumbnail list display instruction has been received (YES in step S524), the processing returns to step S511. On the other hand, when the control unit 201 determines that the thumbnail list display instruction has not been received (NO in step S524), the processing proceeds to step S525.

In step S525, the control unit 201 determines whether wireless LAN communication with the digital camera 100 has been disconnected. Cases where wireless LAN communication is disconnected includes a case where a disconnection instruction is explicitly received by the user and a case where a signal from the digital camera 100 cannot be received for a predetermined time period or longer. When the control unit 201 determines that wireless LAN communication is not disconnected (NO in step S525), the processing returns to step S512. On the other hand, when the control unit 201 determines that wireless LAN communication has been disconnected (YES in step S525), the control unit 201 deletes meta information received and stored in step S514 or S522. Then, the processing of the flowchart ends.

This completes descriptions of operations of the smart device 200 according to the present exemplary embodiment.

According to the present exemplary embodiment as described above, when acquiring metadata of the image corresponding to a thumbnail, metadata can be displayed without making the user conscious of communication for acquiring the metadata. More specifically, the user can confirm the metadata of the image in the digital camera 100 with the same operation feeling as in a case where the metadata of an image already acquired is confirmed.

The first exemplary embodiment has been described above based on a case where detailed information is acquired upon reception of a user instruction after preview display. On the other hand, in the second exemplary embodiment, upon reception of a preview display instruction, detailed information is also acquired together with the main image. When preview display is made for the relevant image, the possibility of receiving an instruction for displaying detailed information is assumed to be higher than in the case of thumbnail list display in which the relevant image is displayed together with other ones. This processing enables shortening the time interval since the time when an instruction for displaying detailed information is received till the time when the detailed information is displayed during preview display.

The present and the first exemplary embodiments have many common portions, and the present exemplary embodiment will be described below centering on portions specific to the present exemplary embodiment.

<System Sequences>

Figure 6:
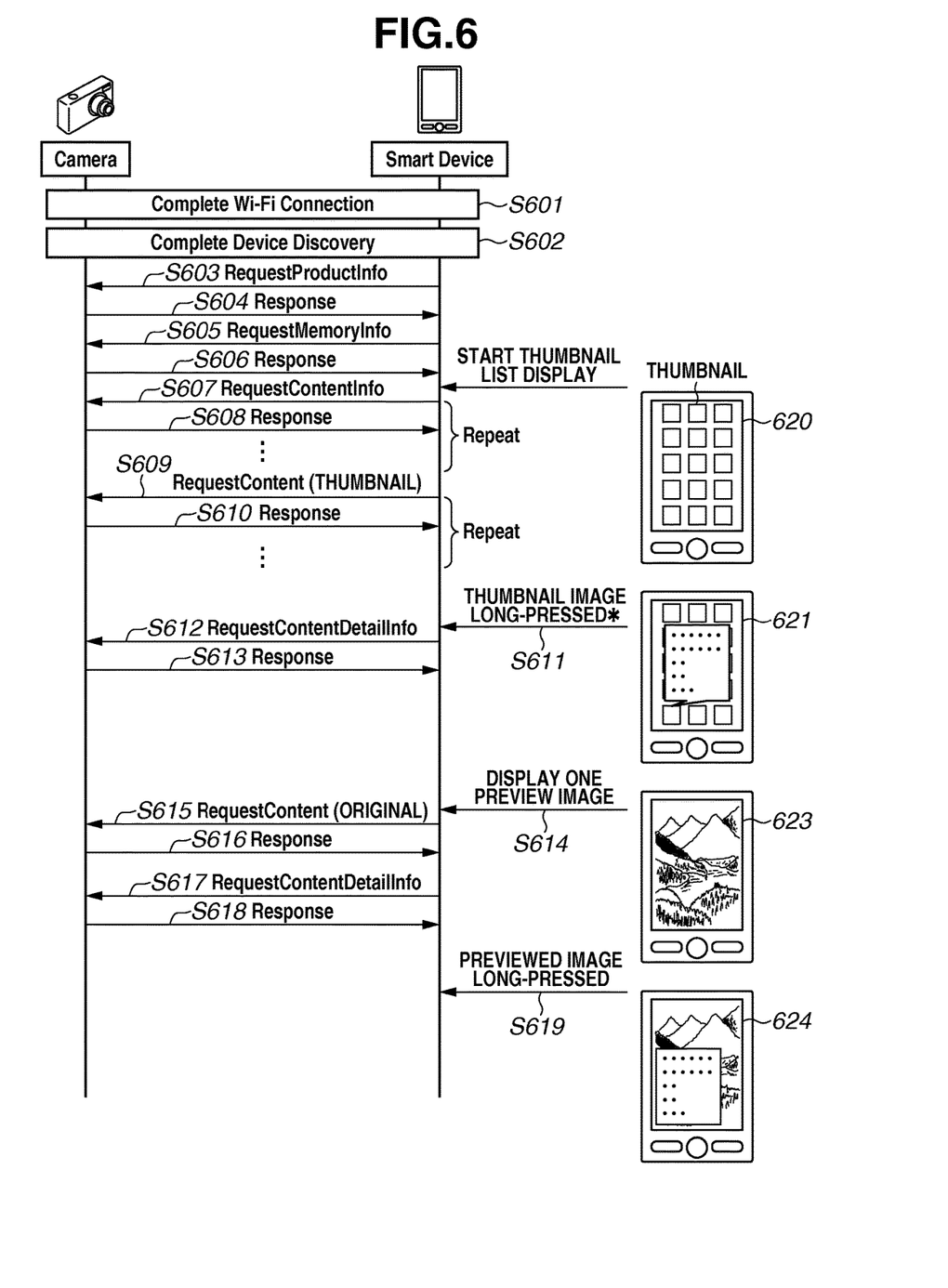
FIG. 6 is a sequence diagram of a system according to a second exemplary embodiment.

FIG. 6 is a sequence diagram illustrating a procedure for browsing data achieved through collaborative operations of the digital camera 100 and the smart device 200 according to the present exemplary embodiment.

The processing in steps S601 to S616 is similar to the processing in steps S401 to S416 illustrated in FIG. 4.

In the present exemplary embodiment, the processing in step S617 to S618 is automatically performed when an image is previewed in steps S614 to S616 in response to a user instruction. The processing in step S617 to S618 is similar to the processing in steps S418 to S419 illustrated in FIG. 4. However, at this timing, the smart device 200 only acquires the metadata and does not display the metadata.

In step S619, similar to the case illustrated in FIG. 4, metadata is displayed upon detection that the previewed image is long-pressed.

In the present exemplary embodiment, as described above, upon reception of a preview display instruction, the smart device 200 performs not only communication and display processing for preview display but also acquires the metadata of the image to be previewed. If detailed information is acquired in advance as described above when the possibility of receiving an instruction for displaying detailed information is assumed to be high, it is possible to shorten the time interval since the time when the instruction for the displaying detailed information is received till the time when the detailed information is displayed. Although, in the following example according to the present exemplary embodiment, acquisition of the metadata is automatically performed and the metadata is displayed in response to a user operation, the processing is not limited thereto. For example, metadata may be displayed at the same time as preview display.

<Operations of Smart Device 200>

Figure 7:
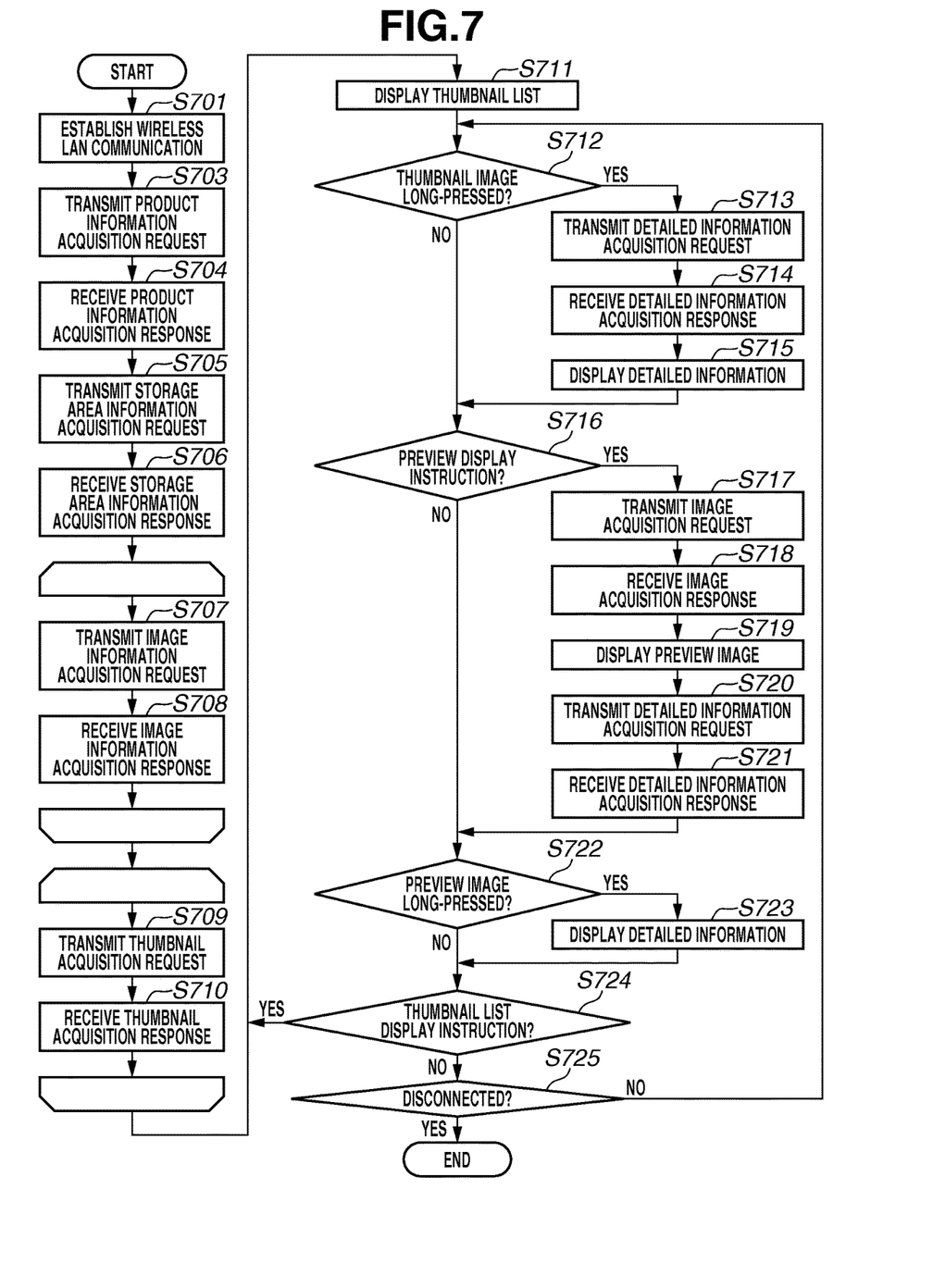
FIG. 7 is a flowchart illustrating operations of a smart device according to the second exemplary embodiment.

The following describes operations performed by the smart device 200 to achieve the procedure illustrated in FIG. 6. FIG. 7 is a flowchart illustrating operations of the smart device 200 according to the present exemplary embodiment. The processing of this flowchart is achieved when the control unit 201 loads a program stored in the nonvolatile memory 203 into the work memory 204 and then executes it. Further, the processing of this flowchart is started, for example, upon reception of an instruction for establishing wireless LAN communication with the digital camera 100 through a user menu operation.

The processing in steps S701 to S715 is similar to the processing in steps S501 to S515 illustrated in FIG. 5.

In step S716, the control unit 201 determines whether an instruction for performing preview display has been received. The processing of this step is similar to the processing in step S516 illustrated in FIG. 5. In step S716, when the control unit 201 determines that the instruction for performing preview display has been received (YES in step S716), the processing proceeds to step S717. On the other hand, when the control unit 201 determines that the instruction for performing preview display has not been received (NO in step S716), the processing proceeds to step S722. Step S716 is equivalent to step S614 illustrated in FIG. 6. Step S722 will be described below.

The processing in steps S717 to S719 is similar to the processing in steps S517 to S519 illustrated in FIG. 5.

In addition, in the present exemplary embodiment, steps S720 and S721 are executed. The processing in steps S720 and S721 is similar to the processing in steps S521 and S522 illustrated in FIG. 5. More specifically, metadata is acquired at the same time as preview display of an image. Similar to the first exemplary embodiment, if metadata has already been received, the processing in steps S720 and S721 is skipped.

In step S722, the control unit 201 determines whether an instruction for displaying detailed information for the currently previewed image has been received. More specifically, the control unit 201 determines whether the currently previewed image has been long-pressed via the operation unit 205 by the user. When the control unit 201 determines that the currently previewed image has been long-pressed (YES in step S722), the processing proceeds to step S723. On the other hand, when the control unit 201 determines that the currently previewed image has not been long-pressed (NO in step S722), the processing proceeds to step S724. Step S722 is equivalent to step S619 illustrated in FIG. 6. Step S724 will be described below.

In step S723, the control unit 201 superimposes the metadata of the currently previewed image received in step S712 onto the currently previewed image. In this case, the processing in steps S720 and S721 has already been performed. Therefore, in comparison with the case where processing in steps S720 and S721 is performed after receiving the relevant instruction in step S722, metadata display will be completed in a shorter time.

The processing in steps S724 and S725 is similar to the processing in steps S524 and S525 illustrated in FIG. 5.

This completes descriptions of operations of the smart device 200 according to the present exemplary embodiment.

As described above, according to the present exemplary embodiment, upon reception of a preview display instruction, the smart device 200 acquires not only the image for preview display but also detailed information for the image. This processing enables improving the response when a detailed display instruction is received during preview display.

Other Exemplary Embodiments

In the above-described first exemplary embodiment, it is possible to display the image preceding or following the currently displayed image during preview display. The above-described operation aims at easily changing the image rather than once returning to the thumbnail list if the user wants to browse other image during preview display. Therefore, during preview display, the possibility of receiving an acquisition request for the images preceding and following the currently displayed image is assumed to be higher than the relevant possibility for other images. Therefore, upon reception of a preview display instruction for the image corresponding to any one thumbnail during thumbnail list display, the smart device 200 may acquire not only the specified image but also the preceding and following images in the background. More specifically, upon reception of a preview display instruction in step S414 illustrated in FIG. 4, the smart device 200 calls the RequestContent API with an argument specification of the specified image ID. At the same time, the smart device 200 calls the RequestContent API with an argument specification of each of the image IDs preceding and following the specified image ID. In addition, as in the second exemplary embodiment, upon reception of a preview display instruction for the image corresponding to any one thumbnail, the smart device 200 may acquire not only the specified image but also detailed information of the relevant image, and further acquire detailed information for the preceding and following images. More specifically, upon reception of a preview display instruction in step S614 illustrated in FIG. 6, the smart device 200 calls the RequestContent API with an argument specification of the specified image ID. At the same time, the smart device 200 calls the RequestContent API with an argument specification of each of the image IDs preceding and following the specified image ID. The smart device 200 further calls the RequestContentDetailInfo API with an argument specification of the specified image ID, and also calls the RequestContentDetailInfo API with an argument specification of each of the image IDs preceding and following the specified image ID.

Acquiring detailed information in advance in this way enables shortening the time interval since the time when an instruction is received from the user till the time when an image and detailed information are displayed.

Aspects of the present invention can also be achieved when a program for implementing at least one of the above-described functions is supplied to a system or apparatus via a network or storage medium, and at least one processor in a computer of the system or apparatus reads and executes the program. Further, the present invention can also be achieved by a circuit for implementing at least one function (for example, an application specific integrated circuit (ASIC)).

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-179322, filed Sep. 3, 2014, which is hereby incorporated by reference herein in its entirety.

What is claimed is:

1. A communication apparatus comprising:
one or more processors coupled to one or more memories;
a communication unit that requests image data from an external apparatus and receives image data from the external apparatus in response to the request;
a display control unit that displays the image data on a display unit; and
a receiving unit that receives an instruction for selecting image data being displayed by the display control unit,
wherein, in a case where the instruction for selecting the image data being displayed by the display control unit is received, the communication unit further requests, from the external apparatus, metadata associated with the selected image data and receives the metadata without receiving the image data which is associated with the metadata,
wherein the communication unit, the display control unit, and the receiving unit are implemented by the one or more processors.

2. The communication apparatus according to claim 1, further comprising a touch panel disposed on the display unit,
wherein, in a case where an operation on the touch panel corresponding to a position where the image data is being displayed satisfies a predetermined condition, the receiving unit determines that image data being displayed at a position that received the operation on the touch panel has been selected.

3. The communication apparatus according to claim 2, wherein the predetermined condition includes a condition that a predetermined time period has elapsed since the touch operation on the touch panel has been started.

4. The communication apparatus according to claim 1, wherein the image data is a thumbnail of a file containing the image data.

5. The communication apparatus according to claim 1, wherein the image data is a thumbnail recorded in a header area of a file containing the image data.

6. The communication apparatus according to claim 1, wherein the communication unit receives the metadata without requesting it.

7. The communication apparatus according to claim 1, wherein the received metadata is retained until communication with the external apparatus is disconnected.

8. The communication apparatus according to claim 7, wherein the communication unit receives the metadata that is retained without requesting it.

9. The communication apparatus according to claim 1, wherein the metadata includes EXIF data.

10. A communication apparatus comprising:
one or more processors coupled to one or more memories;
a communication unit that communicates with an external apparatus;
a recording unit that records computer executable instructions that, when executed, cause the communication unit to request, from the external apparatus, EXIF data recorded in a header area of an image file stored in the external apparatus, and that receives the EXIF data transmitted from the external apparatus in response to the request; and
a control unit that executes the computer executable instructions in response to an instruction from an application loaded into the communication apparatus, wherein the application issues the instruction to the control unit in response to the image data being displayed by a display unit,
wherein, the computer executable instructions, when executed, cause the control unit to control the communication unit to receive the EXIF data transmitted from the external apparatus in response to the request, without receiving image data of the image file, and
wherein the application that issues the instruction to the control unit in response to the image data being displayed by a display unit, is selected by a user,
wherein the communication unit, the recording unit, and the control unit are implemented by the one or more processors.

11. The communication apparatus according to claim 10, wherein, the computer executable instructions, when executed, cause the control unit to control the communication unit not to request the EXIF data which is already received.

12. The communication apparatus according to claim 10, wherein the received EXIF data is retained until communication with the external apparatus is disconnected.

13. The communication apparatus according to claim 12, wherein, the computer executable instructions, when executed, cause the control unit to control the communication unit not to request the EXIF data which is already retained.

14. A method for controlling a communication apparatus, the method comprising:
requesting image data from an external apparatus;
receiving image data transmitted from the external apparatus;
displaying the received image data on a display unit;
receiving an instruction for selecting image data being displayed on the display unit;
in a case where the instruction for selecting the image data being displayed by the display unit is received, requesting, from the external apparatus, metadata associated with the selected image data; and
receiving the metadata without receiving the image data which is associated with the metadata.

15. A non-transitory computer-readable storage medium storing computer readable instructions for causing a computer to execute a process for controlling a communication apparatus, the process comprising:
requesting image data from an external apparatus;
receiving image data transmitted from the external apparatus;
displaying the received image data on a display unit;
receiving an instruction for selecting image data being displayed on the display unit;
in a case where the instruction for selecting the image data being displayed by the display unit is received, requesting, from the external apparatus, metadata associated with the selected image data; and
receiving the metadata without receiving the image data which is associated with the metadata.

* * * * *